United States Patent [19]

Barrera

[11] 4,347,657
[45] Sep. 7, 1982

[54] METHOD FOR THE INSERTION OF PRE-WOUND COILS INTO STATOR SLOTS

[75] Inventor: Giorgio Barrera, Leumann, Italy

[73] Assignee: Officine Meccaniche Pavesi & C. S.p.A., Turin, Italy

[21] Appl. No.: 275,400

[22] Filed: Jun. 19, 1981

Related U.S. Application Data

[62] Division of Ser. No. 169,339, Jul. 16, 1980, Pat. No. 4,291,459.

[30] Foreign Application Priority Data

Feb. 11, 1980 [IT] Italy .............................. 67200 A/80

[51] Int. Cl.³ ............................................ H02K 15/06
[52] U.S. Cl. ........................................ 29/596; 29/606
[58] Field of Search ................ 29/596, 598, 606, 732, 29/734, 736

[56] References Cited

U.S. PATENT DOCUMENTS

| 3,324,536 | 6/1967 | Hill | 29/734 |
| 3,559,268 | 2/1971 | Droll | 29/732 |
| 3,815,206 | 6/1974 | Smith | 29/736 X |
| 4,024,632 | 5/1977 | Inglis | 29/736 |
| 4,304,045 | 12/1981 | Barrera | 29/736 |

Primary Examiner—Carl E. Hall
Attorney, Agent, or Firm—Bernard, Rothwell & Brown

[57] ABSTRACT

The invention relates to a method for the insertion of pre-wound coils into the slots of a stator of a rotary electric machine. The device comprises a cylindrical finger holder having on its periphery an annular series of longitudinal grooves, housing a series of fingers which extend beyond one end of the finger holder to receive the pre-wound coils. At the other end of the cylindrical finger holder opposite that from which the fingers extend is an end portion which is insertable into a stator and is provided with reference means for determining the correct angular orientation of the finger holder and the fingers with respect to the stator slots when the said other end portion of the finger holder is inserted into the interior of a stator. The device further includes means for drawing the finger holder right through the stator, with the said other end portion as the leading end, after this latter has been introduced into the stator, so that the fingers carrying the pre-wound coils are drawn through the stator in the correct angular orientation to effect insertion of the pre-wound coils carried by the fingers into the stator slots.

1 Claim, 11 Drawing Figures

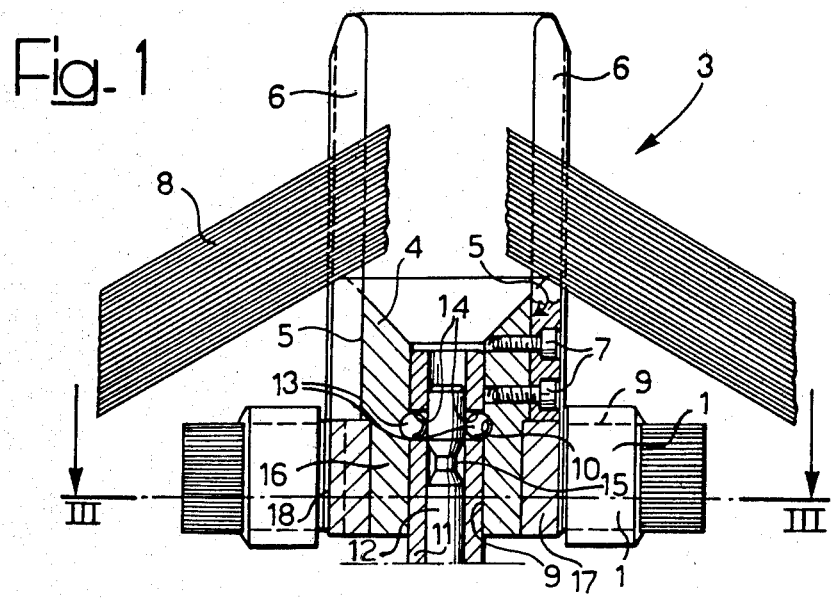
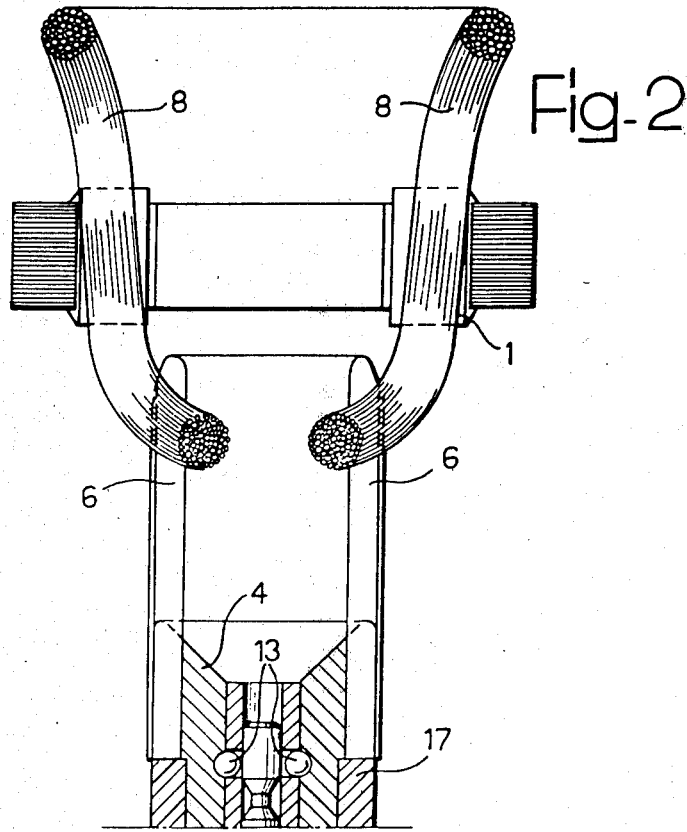

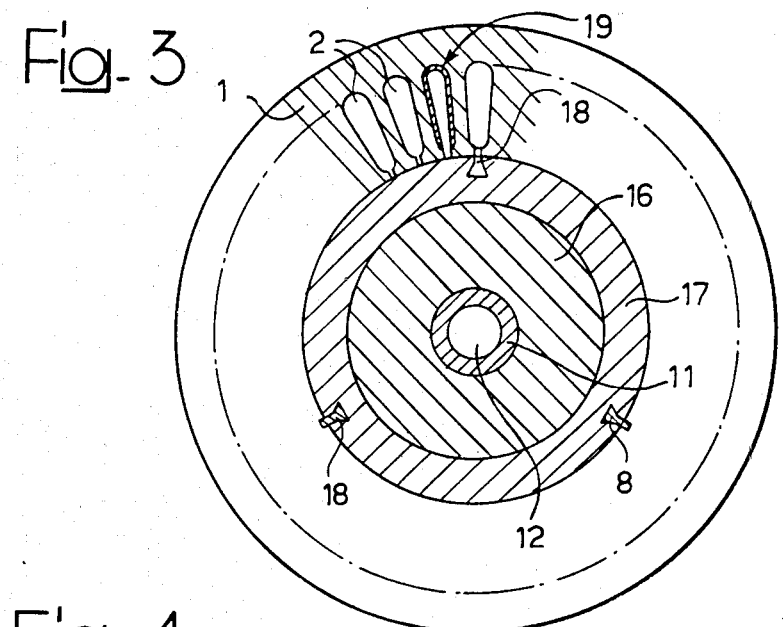
Fig_3
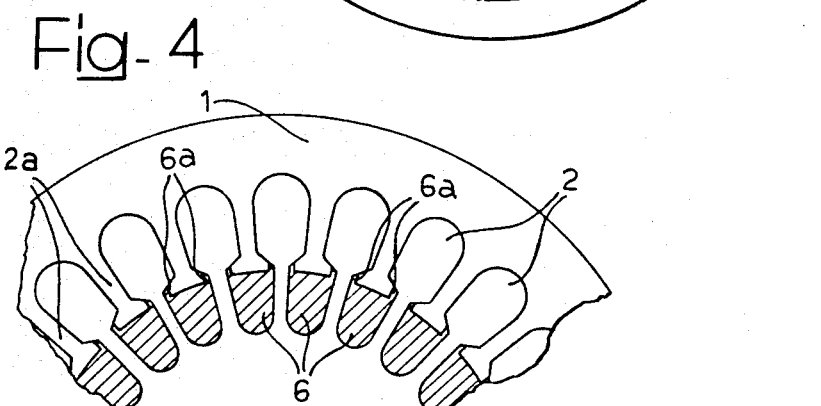
Fig_4
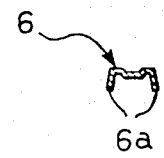
Fig_5
Fig_6
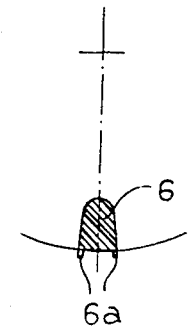
Fig_7

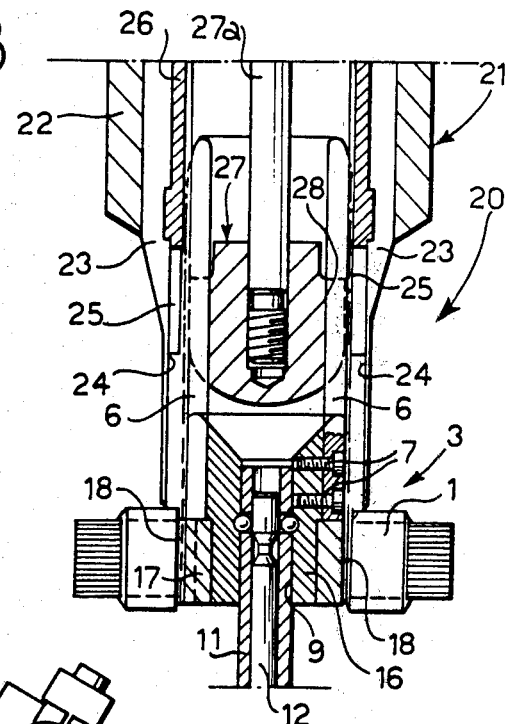
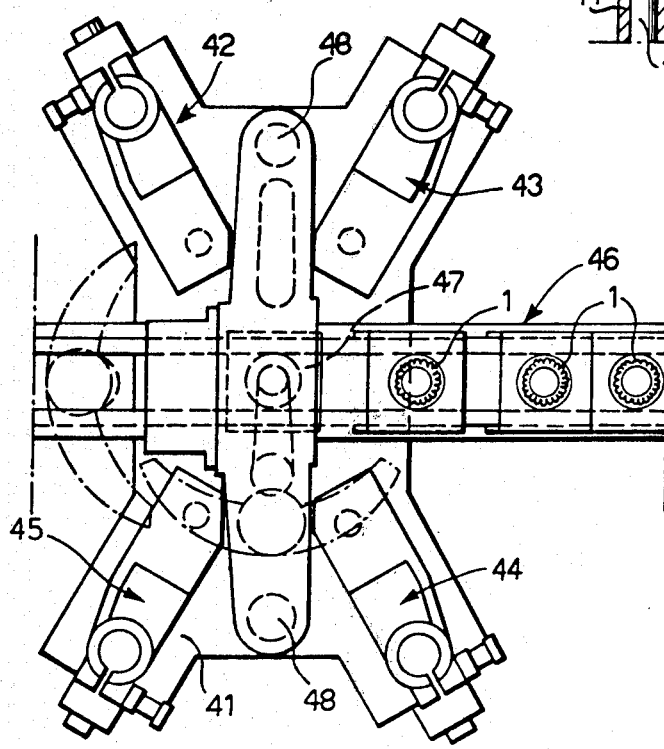

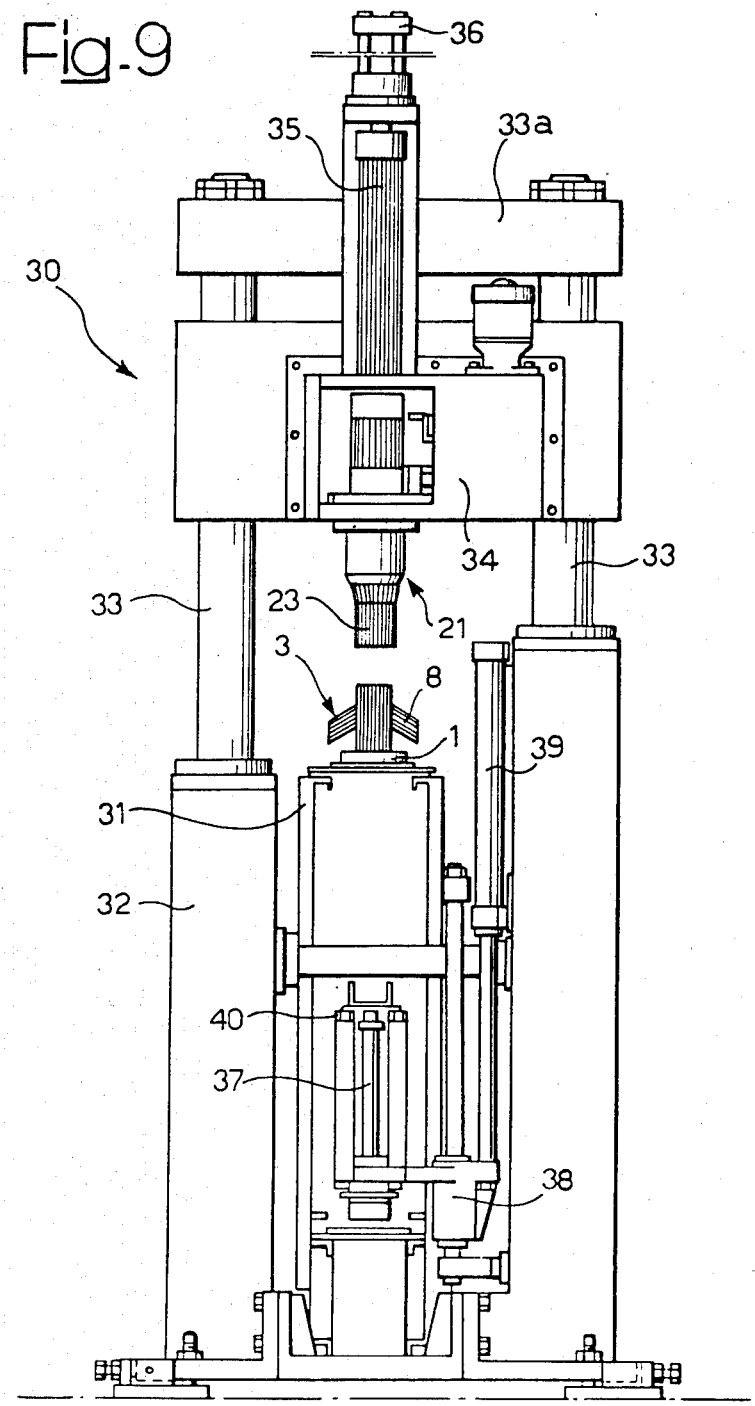

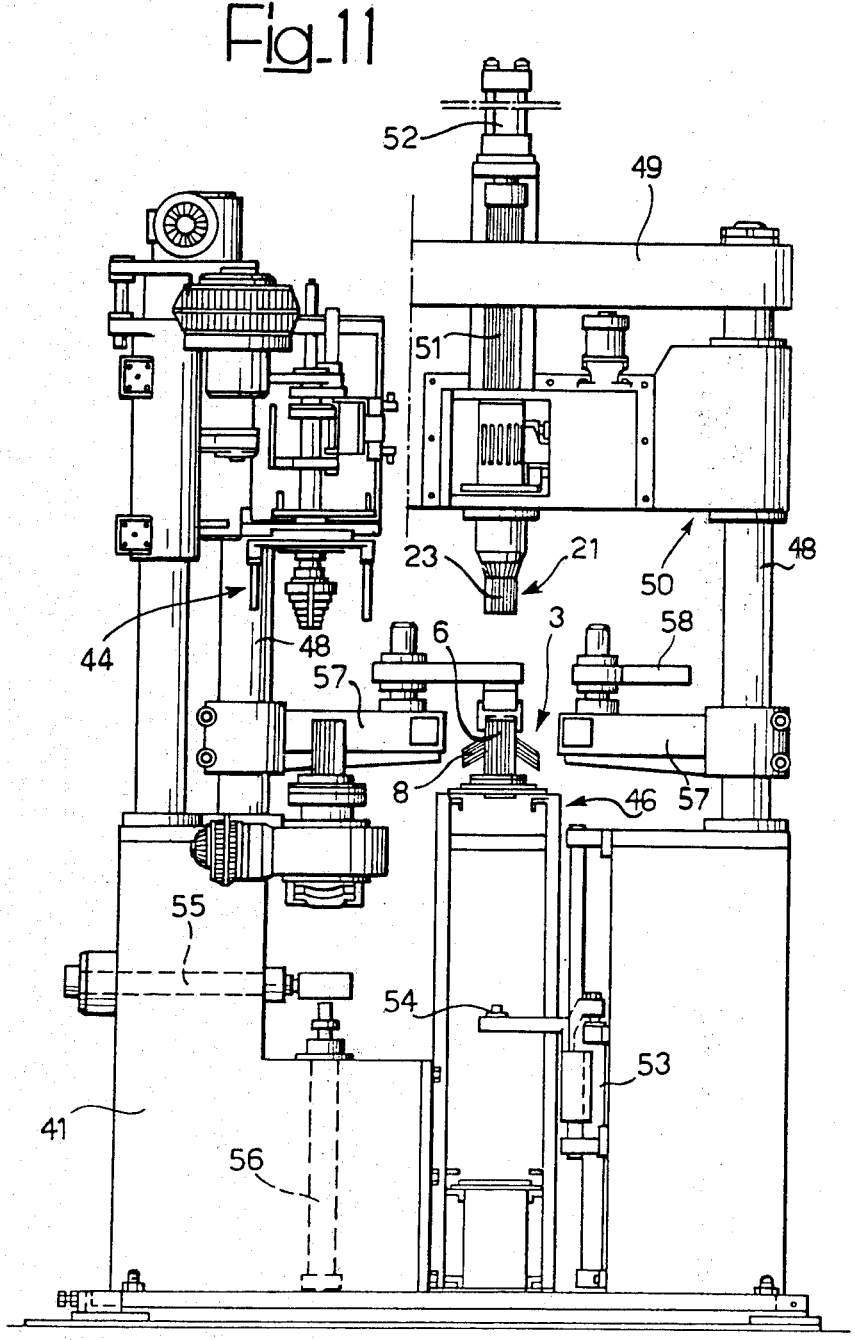
Fig_11

METHOD FOR THE INSERTION OF PRE-WOUND COILS INTO STATOR SLOTS

This is a division, of application Ser. No. 169,339 filed July 16, 1980 and now U.S. Pat. No. 4,291,459.

The present invention relates generally to the production of stators for rotary electric machines, and particularly to a method for inserting pre-wound coils into stator slots.

Devices for performing this operation are known from the prior art, particularly from the prior art specifications which will be discussed below; these devices comprise a cylindrical finger holder having on its periphery an annular series of longitudinal grooves which receive a series of longitudinally extending fingers which project beyond one end of the said finger holder to receive pre-wound coils which are to be inserted into the stator slots. In the following description devices of this general type will be referred to as "devices of the specified type".

A device of the specified type is described and illustrated in U.S. Pat. No. 3,324,536 in the name of HILL. The device forming the subject of this patent also includes a tubular external casing surrounding the fingers and provided with threaded holes into which engage screws for locking the fingers into respective grooves of the finger holder. A star-shaped stripper member having in its outer periphery a series of longitudinal grooves is disposed in the space within the annular series of fingers, and these longitudinal grooves receive those portions of the said fingers which project beyond the finger holder. The stripper member is displaceable axially with respect to the fingers. A stator into which the pre-wound coils are to be inserted has a plurality of axial stator slots defined by an annular series of radially extending stator teeth. The stator is mounted coaxially with respect to the annular series of fingers adjacent the free end of these latter in such a way that the radially inner faces of the stator teeth (which are separated from one another by the stator slots in which the coil is to be inserted) are in contact with the outer faces of the fingers. The stripper is then displaced axially along the fingers towards their free ends so as to force the coils to slide along the fingers until they have been inserted into the stator slots. As described in the above mentioned U.S. Pat. No. 3,324,536 the coil inserting device further includes a series of auxiliary fingers constituting wedge guide members which are arranged in an annular series disposed about the series of fingers which are received in the grooves of the finger holder. The wedge guide members serve for guiding wedge-shape insulating elements into the stator slots during operation of the device. The wedge guide members are shorter than the fingers disposed in the grooves of the finger holder so that in the positions adopted when the device is ready for operation the free ends of the wedge guide members are located at a certain distance from the free ends of the fingers received in the grooves of the finger holder. In this way it is possible to fit a stator over the free ends of the fingers which are lodged in the grooves of the finger holder and to rest the stator itself on the free ends of the wedge guide members, with the stator abutting the ends of the wedge guide members.

This device has a number of disadvantages. First of all, the device has to set up for the insertion of pre-wound coils into the stator slots of a stator having a given axial length, and should it become necessary to utilise the device for the insertion of coils into a stator having a different axial length from that for which the apparatus is set up it is necessary to release locking screws which retain the fingers in the finger holder and axially displace these fingers with respect to the finger holder whereby to adjust the distance between the free ends of these fingers and the free ends of the auxiliary fingers constituting the wedge guide members.

Another disadvantage of known devices of the specified type lies in the fact that, during the actual insertion of pre-wound coils into the stator slots, the wires of each coil are pressed into a cluster in the apertures between the fingers thereby giving rise to friction between the wires of each coil and the surfaces of the fingers in contact with them. This friction can become so great as to render the insertion of the coils impossible, and can further cause the pinching of the wires to the extent that the insulating lacquer becomes damaged. Even without such extreme effects the stripper has to apply a significant force (from 2000 to 4000 Kg.) in order to effect insertion, and this carries with it the ever-present risk of damage to the wires of the coils.

Finally, in the known device described in the above mentioned U.S. Patent the positioning of the stator over the free ends of the fingers lodged on the grooves of the finger holder must be effected with particular precision and accuracy. The outer surface of each finger (which is intended to come into contact with the radially inner face of one of the stator teeth) has, in fact, two longitudinal lateral ridges intended to engage respectively into two adjacent stator slots separated by a stator tooth which itself engages in the longitudinal recess in the finger defined by these axial ridges. Because these ridges have a relatively small thickness they are therefore very delicate, and it is necessary to take great care whilst fitting the stator onto the fingers to ensure that it is perfectly fitted and to avoid causing breakage of these ridges. This problem is particularly acute in the case where the device is to be used in an automatic stator-assembling machine.

Various different arrangements have been tried in an attempt to obviate the above mentioned disadvantages. For example, in order to obtain a simple and rapid adjustment of the device, to accommodate changes in the axial length of the stators being used, it has been proposed to fix the auxiliary fingers constituting the wedge guide means to the tubular outer casing described above and to provide means for axially displacing this tubular outer casing with respect to the finger holder which carries the fingers intended to receive the stator. In this way any desired variation in the distance between the free ends of the fingers lodged in the finger holder and the free ends of the auxiliary fingers constituting the wedge guide means can be obtained simply by effecting a suitable axial displacement of the tubular outer casing with respect to the finger holder. However, the range of adjustment which can be obtained in this way is relatively limited, being equal only to about a third of the axial length of the finger holder itself.

Other arrangements have been proposed specifically for the purpose of avoiding the pinching of the pre-wound coils between the fingers during insertion of the coils into the stator slots. For example U.S. Pat. No. 3,559,268 in the name Droll (corresponding to German Patent No. 1 918 485) relates to a device of the specified type including a stripper similar to that described above, and a series of fingers received in the grooves of the stripper. Some of these fingers are fixed to the stripper rather than to the finger holder in such a way as to be movable axially with it during the insertion of coils into the stator slots, whereby to reduce the friction between the wires of the coils and at least some of the adjacent fingers. In this device, however, the fingers which are fixed to the stripper are subjected to a notable wear of their axial ridges because of the transverse thrust which is exerted on them in use.

The problem of avoiding the above mentioned phenomenon of pinching is also considered in Italian Patent Application No. 69440-A/78 filed Oct. 24, 1978 and in the corresponding U.S. patent application Ser. No. 77,529 filed Sept. 27, 1979 by the same applicant, now U.S. Pat. No. 4,304,045. In the device described in these specifications several of the fingers intended to receive a coil are free to slide axially both with respect to the stripper and with respect to the finger holder such that these fingers move with the stripper only if the frictional forces are sufficiently high for the phenomenon of pinching to occur, whilst they remain firmly connected to the finger holder for movement therewith otherwise. In such a device the frictional forces which are exerted on the "free" fingers are utilised for causing the axial movement of these fingers.

In the known devices described above, although, to some extent at least, the problem of pinching of the pre-wound coil is overcome, the problem of the adaptation of the device to accommodate stators having a different axial length remains.

There are also known prior art devices in which a centering tool is used for the purpose of avoiding the breakage of the longitudinal ridges of the fingers when mounting a stator on these latter. Such a centering tool is constituted by a cylindrical body which has a diameter corresponding to the inner diameter of the stator. The tool has a handle and further includes a series of radial reference fingers intended to be inserted into the stator slots. Before the stator is mounted on the free end of the fingers of the insertion device, an end portion of the centring tool is fitted into the inner space between the fingers adjacent the free end of these. The remaining portion of the tool, carrying the said reference fingers, remains projecting beyond the free ends of the fingers. The stator is therefore mounted onto the fingers of the coil insertion device by making it first pass over the said projecting portion of the tool. The engagement of the radial reference fingers of the tool onto the slots of the stator allows the correct angular orientation of the stator with respect to the annular series of fingers of the coil insertion device before the stator itself comes into contact with these latter. In this way a rapid and precise mounting of the stator can be obtained, whilst at the same time avoiding breakage of the longitudinal ridges of the fingers. Although the use of a centering tool has certain advantages the mounting of a stator by means of a centering tool is extremely difficult if the stator already has a layer of coils fitted thereon. In this case, in fact, because part of each of the coils already fitted extends axially beyond one end of the stator, and also projects into the interior space of the stator itself, it is necessary, before introducing the stator, to arrange the coils in the correct manner in order to ensure that there are no parts of these which can interfere with the centring tool. This is time consuming and requires manual intervention.

The present invention seeks, therefore, to provide a device for the insertion of pre-wound coils into stator slots in stators for electrical machines, by means of which all the advantages obtainable separately by means of the known devices described above can be obtained, whilst at the same time all the above mentioned disadvantages of the prior art can be avoided.

Therefore, according to one aspect of the present invention, there is provided a device for the insertion of pre-wound coils into the slots of a stator of a rotary electric machine, of the type comprising: a cylindrical finger holder having on its periphery an annular series of longitudinal grooves and a series of fingers fixedly located in the grooves of the said finger holder and extending beyond one end of the said finger holder to receive thereon the pre-wound coils, characterised in that the other end of the said cylindrical finger holder opposite to the said one end from which the fingers project, has an end portion extending axially beyond the fingers, in that the said other end portion is provided with angular orientation reference means for cooperating with the slots of a stator whereby to obtain the correct angular orientation of the annular series of fingers with respect to the slots of the stator when the said other end portion of the finger holder is inserted into a stator, and in that there are provided means for effecting axial displacement of the said finger holder, with the said other end portion as the leading end, after this latter has been introduced into a stator, whereby to cause the said fingers to be drawn through the stator by the finger holder and to draw pre-wound coils carried thereon into the slots of the stator. The said reference means may be formed directly on the finger holder itself, although in a preferred embodiment there is provided an annular member surrounding the finger holder and carrying the said reference means.

With such a device there is no constraint on the axial length of the stator which can be used with the device, and because of the reference means with which the end portion of the finger holder is provided there is no necessity for a separate centering tool in order to obtain the correct angular orientation of the stator and the finger holder in order to ensure proper alignment with the stator slots. This makes the device according to the invention particularly suitable to be used in automatic machines.

Moreover, the device according to the invention is not subject to the above described disadvantage due to pinching of the wires of the coils. In particular, in order for the fingers to draw the coils into the stator slots the friction which is created between the wires of the coil and the fingers themselves is exploited. This friction is rather less than that which occurs in the known devices and it allows the utilisation of a very modest coil-insertion force, not greater than 400 Kg., for the displacement of the finger holder.

The device forming the subject of the present invention is constructively simple and of low cost, and embodiments of the invention can be made both economically and simply.

According to a second aspect of the present invention there is provided a method for the insertion of pre-wound coils into the slots of a stator of a rotary electric machine using a cylindrical finger holder having on its periphery a series of longitudinal grooves and an annular series of fingers fixed in the grooves of the said finger holder and extending beyond one end of the said finger holder to receive the said pre-wound coils, characterised in that the said method comprises the steps of: inserting into a stator an end portion of the cylindrical finger holder opposite the end thereof from which the said fingers project, angularly orienting the finger holder in order to align pre-wound coils carried by the fingers thereof with the stator slots, and effecting an axial displacement of the said finger holder through the stator with the said end portion as the leading end, whereby to cause the said fingers to draw the pre-wound coils carried thereon through the stator and to insert them into the slots of the stator.

As distinct from all known methods, in which insertion of the pre-wound coil into the grooves of the stator is effected by a displacement of the coil towards the free ends of the fingers on which these coils are disposed, in the method according to the present invention the insertion of the coils into the grooves of the stator is obtained by causing a displacement of the coils in the opposite direction, away from the free ends of the fingers on which the coils are disposed. In other words, the coils are "drawn" rather than "pushed" into the grooves of the stator. In order that the coils be drawn by the fingers the friction which is created between the wires of the coil and the fingers in contact with these is exploited. It is thus possible, as already mentioned, to utilise only quite modest forces (in any case not greater than 400 Kg) for effecting the displacement of the finger holder.

Various embodiments of the present invention will now be more particularly described, by way of example, with reference to the accompanying drawings, in which:

FIG. 1 is an axial sectional view of part of one embodiment of a device according to the present invention;

FIG. 2 is an axial sectional view of a part of the device illustrated in FIG. 1, in a different operating position;

FIG. 3 is a sectional view taken on the line III—III of FIG. 1;

FIG. 4 is a partial sectional view taken on the line III—III of FIG. 1 with the device in a different operating position;

FIGS. 5, 6 and 7 illustrate three different variations of a component of the device illustrated in FIG. 1;

FIG. 8 illustrates a further embodiment of the device according to the invention;

FIG. 9 is a side view of an automatic machine utilising the device of FIG. 8; and FIGS. 10 and 11 are, respectively, a plan view and a side view of another machine utilizing the device illustrated in FIG. 8.

Referring now to the drawings, there is shown a stator 1 for a rotary electric machine in the form of an annular body having on its inner surface a series of longitudinal slots 2 (see FIG. 4) intended to receive the coils constituting the winding of the stator. The slots 2 are defined between adjacent pairs of radially inwardly projecting stator teeth 2a.

A device for the insertion of pre-wound coils into the slots 2 of the stator 1 is generally indicated 3; the device 3 comprises a cylindrical finger holder 4 having on its radial outer cylindrical wall an annular series of longitudinal grooves 5, two diametrically opposite grooves of which are visible in FIGS. 1 and 2. Lodged within the grooves 5 of the finger holder 4 is an annular series of fingers 6 (see also FIG. 4). The fingers 6 are fixed to the finger holder 4 by means of screws 7 as can best be seen in FIG. 1.

The fingers 6 extend beyond one end of the finger holder 4 to receive, in a manner analogous to that described and illustrated in U.S. Pat. No. 3,324,536, the pre-wound coils 8 which are to be inserted into the slots 2 of the stator 1. The finger holder 4 has a cylindrical cavity 9 with a circumferential groove 10 located approximately mid-way along it.

A hollow shaft 11 in the form of a tubular element projecting into the cavity 9 is slidable with respect to the finger holder 4 but can be fixed axially thereto by means of a plunger member 12 mounted slidably within the shaft 11 and operable to cause a series of balls 13 lodged in respective radial holes 14 in the wall of the tubular shaft 11 to become urged radially outwardly to engage in the groove 10 to effect axial fixing. The plunger member 12 has a portion of reduced diameter 15. When this portion is located adjacent the radial holes 14 the tubular shaft 11 is free to slide axially with respect to the finger holder 4 because the balls can move radially inwardly. When the plunger element 12 is displaced axially with respect to the tubular shaft 11 in such a way as to move the portion of reduced diameter 15 out of axial alignment with the radial holes 14, the balls 13 are pressed into engagement in the groove 10 whereby to join the tubular shaft 11 and the finger holder 4 rigidly together in respect of axial displacements and axial forces.

The finger holder 4 has an end portion 16 which extends axially beyond the fingers 6 at the end opposite that end of the finger holder 4 from which the fingers 6 project. On this end portion 16 of the finger holder 4 there is fixed an annular element 17 having an outer diameter corresponding to the inner diameter of the stator 1. This annular element is provided with a set of three reference keys 18 angularly equidistantly spaced from one another, projecting from the periphery of the annular element 17 and able to be inserted in the manner illustrated in FIG. 3 into the correspondingly angularly spaced slots 2 of the stator 1.

The operation of the device described above is as follows:

Before proceeding to mount the unit comprising the finger holder 4 and the fingers 6 onto the stator 1, the pre-wound coils 8 are disposed on the fingers 6 in the pre-established pattern according to the requirements of the stator. At this point the end portion 16 of the finger holder 4 carrying the annular element 17 is inserted into the stator 1 causing the engagement of the three reference keys 18 in three of the slots 2 of the stator 1. The unit comprising the finger holder 4 and the fingers 6 is thus inserted into the interior of the stator 1 from above until it is carried into the position illustrated in FIG. 1, by means of a displacement which, with reference to the orientation as viewed in FIG. 1, takes place from above downwardly.

The engagement of the reference keys 18 of the annular element 17 into the slots 2 of the stator 1 ensures the correct angular orientation of the annular series of fingers 6 with respect to the slots 2 of the stator 1.

Once the annular element 17 has been introduced into the interior of the stator 1, the tubular shaft 11 is introduced up from below into the cavity 9 of the finger holder 4 and fixed to this finger holder by displacing the plunger member 12 in such a way as to cause the engagement of the balls 13, by moving outwardly, in the circumferential groove 10 of the cavity 9. With the tubular shaft 11 now fixed to the finger holder 4, axial displacement of the tubular shaft 11 downwardly, as viewed in FIG. 1, takes place so as to force the fingers 6 and the pre-wound coil 8 disposed on them to be drawn through the stator 1. The section illustrated in FIG. 4 is contained in the plane indicated with the line III—III in FIG. 1 and corresponds to that stage of the downward displacement of the finger holder 4 during which the free ends of the fingers 6 are in contact with the inner surface of the stator. The downward movement of the finger holder 4 continues until the unit comprising the finger holder 4 and the fingers 6 is carried into the position illustrated in FIG. 2. When the unit reaches this position the coils 8 are by now inserted in the corresponding slots 2 of the stator 1. During insertion the coils 8 follow the fingers 6 because of the frictional force exerted between the wires of the coil and the fingers; this frictional force is, however, not high.

The fingers 6 may have one of various different forms in transverse section, as is illustrated in for example FIGS. 5 to 7. In each case, however, each finger has two longitudinal ridge portions 6a at either side, which are operable to become engaged (see FIG. 4) into the adjacent pair of slots 2 of the stator 1 which delimits the inner surface portion of the stator tooth 2a with the radially inner surface of which each finger 6 comes into contact.

The presence of the annular element 17 having the reference keys 18 ensures that the proper angular orientation of the annular series of fingers 6 with respect to the slots 2 of the stator 1 is obtained, whereby to avoid the breakage of the small ridges 6a of the fingers during the insertion of the fingers into the stator 1. This is of vital importance because the first part of each finger which comes into contact with the stator is that end fixed to the finger holder. There is thus no resilience in the mounting of the fingers and any angular misalignment would almost certainly lead to breakage of these ridges.

The walls of each slot 2 of the stator 1 are, of course, covered with an insulating material 19 (see FIG. 3).

If it should be necessary to introduce into the slots 2 of the stator 1 wedge-shape insulating elements (sometimes called "keys" by those skilled in the art) for the end closure of the stator slots and to retain the coils, this operation can be performed separately, by known means, or else can be performed contemporaneously with the operation of insertion of the coils by utilising the device illustrated in FIG. 8.

The parts of the device illustrated in FIG. 8 whichf are in common with the devices illustrated in FIG. 1 are indicated with the same reference numerals as in FIG. 1.

Referring now to FIG. 8, the device as a whole is indicated generally with the reference numeral 20; it comprises a device 3, identical to that illustrated in FIG. 1, for the insertion of pre-wound coils into the slots 2 of a stator 1, and a device 21 of a type known per se, for the introduction of wedges or closure keys into the slots 2 of the stator 1.

The wedge insertion device 21 comprises an outer tubular casing 22 within which there is located an annular series of auxiliary fingers 23 which surround the annular series of fingers 6. The auxiliary fingers 23, herein-after referred to as wedge guide members, are provided with grooves 24 in their side faces for the guidance of closure keys or wedges 25 (referred to in the abovementioned U.S. Pat. No. 3,324,536 as "bore wedges") into the slots 2 of the stator 1. The outer casing 22 and the auxiliary fingers 23 serve the same function as that of the corresponding elements forming part of the device illustrated in U.S. Pat. No. 3,324,536.

A series of wedge pusher elements 26 are provided for pushing the wedges or keys 25 along the grooves 24 of the wedge guide members 23 until they have been inserted into the stator slots. The device 21, in the embodiment illustrated by way of example in FIG. 8, also comprises an element 27, axially displaceable by means of a control shaft 27a, which is entirely similar to the stripper illustrated in the abovementioned U.S. Patents. The element 27 is provided around its periphery with an annular series of longitudinal grooves 28 able to receive the fingers 6. In the case of the device of FIG. 8 the element 27 is not used as a stripper, but rather as an abutment element contacting the back of the wedges 25 during the insertion of these wedges into the stator slots.

The operation of the device illustrated in FIG. 8 is as follows:

First, the unit comprising the finger holder 4 and the fingers 6 is inserted from above, downwardly into the stator 1 in a manner analogous to that described for the device illustrated in FIG. 1. The tubular shaft 11 is then inserted up from below into the interior 9 of the finger holder 4 and locked into axial engagement with the finger holder by means of the balls 13 by acting on the plunger element 12.

At this point the device 21 is lowered from above onto the stator 1 until the free ends of the auxiliary fingers constituting the wedge guide members 23 have been carried into the position where they rest on the upper surface of the stator 1 engaging against the radially outer faces of the fingers 6 of the device. The wedge pusher elements 26 and the element 27 are then axially displaced downwardly whilst, at the same time, the downward axial displacement of the tubular element 11 is also effected. In this way both the pre-wound coils 8 and the closure keys or wedges 25 are inserted into the stator slots.

It is possible to provide a spacer element fixed onto the upper end of the finger holder 4 so that the element 27 comes into contact with it when the wedge-insertion device 21 is located in a position ready for the insertion operation. In this way it is possible to effect displacement both of the element 27 and of the finger holder 4 by acting only on the shaft 27a.

FIG. 9 illustrates an automatic machine utilising the coil insertion device 20 illustrated in FIG. 8. This machine, which is generally indicated with the reference numeral 30, is associated with an automatic pallet-type conveyor line 31 (seen in end view) which supplies to the insertion device a succession of stators 1 into which the pre-wound coils are to be inserted.

As can be seen in FIG. 9, the machine 30 comprises a base 32 which supports two columns 33 connected by a cross-piece 33a. On the columns 33 there is mounted, in a vertically slidable manner, a bridge structure 34 containing apparatus, of a type known per se, for the preparation of the closure keys or wedges intended to be inserted into the slots of the stator. A unit including an assembly of wedge pusher elements 35 for driving the wedges into the stator is generally indicated 34. An hydraulic actuator cylinder 36 is provided for effecting the displacement of the wedge pusher elements 35. An hydraulic actuator cylinder of known type, not visible in the drawing, is provided for effecting the vertical displacement of the bridge structure 34 up and down the columns 33. From the unit 34 there projects downwardly a device 21, similar to that described with reference to FIG. 8, for the introduction of the wedges into the stator slots.

The shaft intended to control the axial displacement of the device 3 for obtaining the insertion of the coils into the interior space of the stator is indicated 37. The shaft 37 is fixed to a support element 38 which is guided in a vertically slidable manner with respect to the base 32 and is connected to this latter by means of a control cylinder 39. A chain conveyor 40 is utilised for the recovery of the insertion devices after these have been utilised since, obviously, these pass right through the stator starting from above and ending below, and require to be returned to a position above the working station for subsequent re-use.

The operation of the machine illustrated in FIG. 9 is as follows:

When the pallet conveyor 31 carries a stator 1 into position in the working station of the machine, the device 3 including the finger holder 4 and the fingers 6 carrying the pre-wound coil has already been preliminarily positioned partly inserted into the interior of this stator in the manner which has been described above. At this point the cylinder 39 is controlled to retract in such a way as to raise the shaft 37 (which corresponds to the shaft indicated with the reference numeral 11 in FIG. 8) and to insert it into the cavity 9 of the finger holder 4 of the device 3. Contemporaneously the bridge structure 34 is lowered to carry the device 21, and in particular the auxiliary fingers 23 constituting the wedge guide means for the insertion of the wedges, down into the position illustrated in FIG. 8. The insertion of the pre-wound coils 8 into the hollow interior of the stator 1 is then obtained by extending the actuator cylinder 39 so as to displace the finger holder 4 of the device 3 downwardly to draw the fingers 6 through the stator 1. At the same time the actuator of the unit 35 is operated to drive the wedges into the stator slots as described in relation to FIG. 8.

When the shaft 37 has been lowered by extension of the actuator 32 to the position illustrated in FIG. 9, the unit comprising the finger holder 4 and the fingers 6, which has passed right through the stator 1, is recovered by the chain conveyor 40, so that the shaft 37 is now free to become inserted into the next finger holder forming part of the coil-insertion device which is next fed to the machine. At the same time the bridge structure 34 returns to its raised position.

FIGS. 10 and 11 are, respectively, a plan view and a side view of another machine utilising the device illustrated in FIG. 8.

The machine illustrated in these Figures is associated with an automatic pallet conveyor line, as can be seen in FIG. 10, although it can be used separately from such a conveyor if desired. The machine comprises a base 41 on which there are supported four winding heads 42 to 45 of a type known per se for the formation of coils on the fingers of the insertion devices. The machine is associated with an automatic pallet transport line 46 which feeds stators 1 in succession to a work station 47 where they receive the pre-wound coils formed by the winding heads 42 to 45. On the base 41 there are mounted two columns 48 connected by a crosspiece 49 (only part of which is shown in FIG. 11) and supporting, in a slidable manner, a bridge structure 50 containing apparatus, of a type known per se, for the preparation of the wedges intended to be inserted as closure keys into the stator slots. In this case too, there is provided a set of wedge pusher elements 51 for driving the wedges along the auxiliary fingers 23 constituting the wedge guide means of the wedge-insertion device 21 carried below the bridge structure 50, and an hydraulic actuator cylinder 52 for effecting axial displacement of the wedge pusher elements 51.

In a manner similar to that described in relation to FIG. 9, there is provided a lower actuator cylinder 53 for effecting axial displacement of an element 54 which corresponds to the hollow shaft 11 of FIG. 1 and which is engageable from below into the finger holder of the coil insertion device in order to draw it through a stator to effect insertion of the pre-wound coils into the stator slots.

The machine is further provided with a horizontal actuator cylinder 55 which acts to withdraw the coil insertion devices laterally after these have been utilised for the insertion of the coils into the stator, and with an associated vertical actuator cylinder for carrying them up into a position where they can be taken up by the winding heads for a subsequent cycle of operations.

In addition, each of the two columns 48 is provided with a respective support 57 on which there is mounted, projecting therefrom and rotatable about a vertical axis, a working arm 58 serving for the transport of the insertion devices between a position where they can be operated on by the winding heads and the working station 47 of the machine.

The operation of the machine described above is as follows:

The windind heads 42 to 45 operate to form coils on the fingers 6 of an insertion device 3 which is located on correspondence with these, according to a pre-established sequence. When the windings formed on the fingers of the insertion device 3 which is located at one of the winding heads have been completed, one of the two working arms 58 carries the insertion device 3, with the pre-wound coils disposed on it, into the working region 47 and inserts it, downwardly from above, in the manner which is described above with reference to FIG. 1, into a stator 1 which has been fed by the conveyor line 46 into the work station 47. At the same time the cylinder 55 is retracted to withdraw the insertion device which was last utilised, and following the completion of this retraction the cylinder 56 is extended to carry this insertion device up to the first winding head. At this point the actuator cylinder 53 is driven to extend to cause the element 54 on the finger holder of the device 3 to engage, whilst, at the same time, the bridge structure 50 is lowered in such a way as to carry the device 21 and the auxiliary fingers 23 into the position illustrated in FIG. 8. From this position the insertion phase is then performed in a manner entirely similar to that which is described above with reference to FIG. 9. Once the insertion device has been utilised, the cylinders 55 and 56 carry it back into a position adjacent one of the winding heads ready to perform another cycle of operations.

What is claimed is:

1. A method for the insertion of pre-wound coils into stator slots of a stator of a rotary electric machine using a cylindrical finger holder having on its periphery a series of longitudinal grooves and an annular series of fingers fixed in said grooves of said finger holder and extending beyond one end of the said finger holder to receive said pre-wound coils, said method comprising the steps of:

inserting into a stator an end portion of said cylindrical finger holder opposite said one end thereof from which said fingers project;

angularly orienting said finger holder in order to align pre-wound coils carried by said fingers thereof with said stator slots, and effecting an axial displacement of said finger holder through said stator with said end portion as the leading end thereof, whereby to cause said fingers to draw said pre-wound coils carried thereon through said stator and to insert them into the slots of said stator.

* * * * *